United States Patent Office 3,117,978
Patented Jan. 14, 1964

3,117,978
1,4-BENZODIOXANE-2-CARBOXAMIDES
John H. Biel, Milwaukee, and Claude I. Judd, Thiensville, Wis., assignors to Lakeside Laboratories, Inc., Milwaukee, Wis., a corporation of Delaware
No Drawing. Filed Jan. 25, 1961, Ser. No. 84,753
3 Claims. (Cl. 260—340.3)

This invention relates to novel chemical compounds and processes of preparing the same. More particularly, this invention is concerned with novel amides of 1,4-benzodioxane-2-carboxylic acid, processes of producing such compounds, and pharmaceutical uses for the amides.

According to the present invention there are provided novel 1,4-benzodioxane-2-carboxamides of the formula

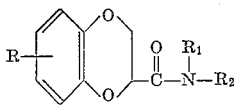

in which R is hydrogen, lower alkyl such as ethyl, lower alkoxy such as methoxy and ethoxy, a halogen such as bromine and chlorine, trifluoromethyl, and lower alkyl thio groups such as methylthio and ethylthio, $R_1$ is hydrogen, a lower alkyl such as methyl, ethyl, propyl, isopropyl and butyl, a phenyl-lower alkyl such as benzyl and phenethyl, a lower alkenyl such as allyl, and a lower alkynyl such as propargyl, and $R_2$ is a phenyl-lower alkyl such as benzyl, phenethyl, phenylpropyl and phenylisopropyl, a nuclear substituted phenyl-lower alkyl group such as hydroxyphenylisopropyl, a halophenylalkyl group such as p-bromophenylisopropyl, a lower alkoxyphenylalkyl group such as m-methoxyphenylethyl, a lower alkyl thio phenyl alkyl group such as p-methylthiophenylisopropyl, a trifluoromethylphenylalkyl group such as trifluoromethylphenylethyl, a lower alkylenedioxyphenylalkyl group such as 3,4-methylenedioxyphenylisopropyl, a phenylcycloalkyl group such as phenylcyclopropyl, a nuclear substituted phenylcyclopropyl group such as a halophenylcyclopropyl like p-chlorophenylcyclopropyl, hydroxyphenylcyclopropyl, a lower alkoxy phenylcyclopropl group such as p-methoxyphenylcyclopropl, a lower alkylenedioxy phenylcyclopropyl group such as 3,4-methylenedioxyphenylcyclopropyl, a lower alkylthio phenylcyclopropyl group such as p-methylthiophenylcyclopropyl, trifluoromethylphenylcyclopropyl groups, and (3-indolyl)-lower alkyl groups such as represented by the formula

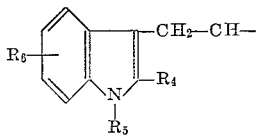

wherein $R_3$ is hydrogen or a lower alkyl such as methyl, ethyl, propyl and isopropyl, $R_4$ is hydrogen or methyl, $R_5$ is hydrogen or a lower alkyl such as methyl or ethyl and $R_6$ is hydrogen or hydroxy.

These compounds can be produced by reacting 1,4-benzodioxane-2-carbonyl chloride with an arylalkyl amine. This process can be represented as follows:

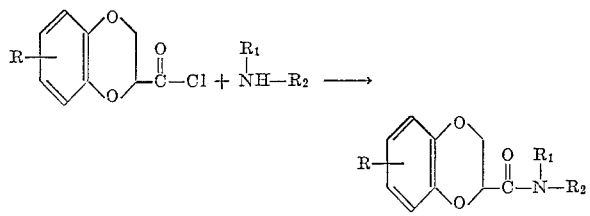

wherein R, $R_1$ and $R_2$ have the significance assigned above.

Some of the arylalkylamines which can be used in the process are benzylamine, phenethylamine, 1-phenyl-2-aminopropane, 1-phenyl-2-aminobutane, 3,4-methylenedioxyphenethylamine, phenylcyclopropylamine, p-hydroxyphenylcyclopropylamine, 1-(3-indolyl)-2-aminoethane, alpha-methyltryptamine, alpha-ethyltryptamine and 1-(N-methyl-3-indolyl)-2-aminoethane.

The reaction can be readily effected by reacting 1,4-benzodioxane-2-carbonyl chloride with the aralkylamine in an inert liquid reaction medium such as ether, benzene and dioxane, and advisably in the presence of an acid acceptor which may be an excess of the reacting amine, a tertiary amine such as triethylamine, or an inorganic base such as potassium carbonate. The reaction can be effected over a wide range of temperatures but the preferred temperature range is 0 to 30° C. After the reaction is terminated the product can be isolated from the reaction mixture by evaporating the solvent. Purification of the product can be achieved by conventional means. The products are generally colorless crystalline solids, and in most cases are a mixture of isomers since asymmetric carbon centers are present.

Some of the N-(aralkyl)-1,4-benzodioxane-2-carboxamides which are produced in this way are N-(2-phenylcyclopropyl) - 1,4 - benzodioxane - 2 - carboxamide, N-(2-phenyl-1-propyl)-1,4-benzodioxane-2-carboxamide, N-(1-[3-indolyl]-2-butyl)-1,4-benzodioxane-2-carboxamide, N-(1 - [3 - indolyl] - 2 - ethyl) - 1,4 - benzodioxane - 2 - carboxamide, N-(2-phenyl-1-ethyl)-1,4-benzodioxane-2-carboxamide, and the corresponding compounds in which the phenyl group is substituted as with a hydroxy, lower alkoxy, halo, 3,4-methylenedioxy, lower alkyl thio group or trifluoromethyl group.

The amides provided by this invention have psychopharmacologic action and are considered useful in the therapeutic treatment of mental illness, particularly as antidepressants. The amides are monoamine oxidase inhibitors and this action is believed to result in the antidepressant effect. The compounds are central nervous system stimulants. The treatment of hypertension, arthritis, angina pectoris and ulcerative colitis with these compounds is indicated.

Although the aralkylamines have therapeutic activities of the types described, the amides of 1,4-benzodioxane-2-carboxylic acid maintain these activities but reduce or eliminate objectionable side effects. Thus, phenylcyclopropylamine causes tachycardia, increases in blood pressure and jitteriness; these side effects are greatly reduced in the novel amides of this invention.

The amides can be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid can be used. The prefered liquid carrier is water. Flavoring materials may be included in the solution as desired.

Solid pharmaceutical carriers such as starch, sugar, talc and the like can be used to form powders. The powders can be used as such for direct administration to a patient or, instead, the powders can be added to suitable foods and liquids, including water, to facilitate administration.

The powders may also be used to make tablets and troches and in capsules. Suitable lubricants like magnesium stearate, binders such as gelatin and disintegrating agents like sodium carbonate in combination with citric acid can be used to form tablets. Suppositories can also be made containing these active amides.

Dosage unit forms such as tablets, capsules, troches and suppositories may contain any suitable predetermined amount of one or more of the active amides and they may be administered one or more at a time as prescribed.

Such dosage unit forms can contain from about 1 to 50% or more of active amide, but usually about 5 to 200 mgm. thereof.

The following examples are presented to illustrate the invention.

EXAMPLE 1

*N-(Trans-2-Phenylcyclopropyl)-1,4-Benzodioxane-2-Carboxamide*

A mixture of 7.5 g. (0.056 mole) of trans-2-phenylcyclopropylamine and 10.1 g. of potassium carbonate in 50 cc. of anhydrous benzene was treated dropwise with 11.2 g. (0.056 mole) of 1,4-benzodioxane-2-carbonyl chloride. The mixture was stirred several hours at room temperature, water (100 cc.) was added and the layers separated. After washing with dilute hydrochloric acid and dilute sodium hydroxide solution, the benzene layer was dried over anhydrous potassium carbonate. Removal of the solvent under reduced pressure left 16.0 g. of an oil which crystallized when covered with n-hexane (Skelly–B) and slowly diluted with ether, yielding 7.5 g. of solid, M.P. 96–112° C. The solid was dissolved in 300 cc. of ether, filtered, concentrated to 100 cc. of solution and allowed to crystallize to 10° C. The precipitated solid weighed 3.1 g.; M.P. 129–131° C.

*Analysis.*—Calcd. for $C_{18}H_{17}NO_3$: N, 4.74. Found: N, 4.78.

Dilution of the mother liquors with n-hexane (Skelly–B) afforded 1.4 g. of the isomeric amide, M.P. 101–103° C.

*Analysis.*—Calcd. for $C_{18}H_{17}NO_3$: N, 4.74. Found: N. 4.95.

Example 2

*N-(2-Phenyl-1-Propyl)-1,4-Benzodioxane-2-Carboxamide*

A solution of 27 g. (0.2 mole) of amphetamine in 200 cc. of anhydrous ether was treated at 0° C. with 20 g. (0.1 mole) of 1,4-benzodioxane-2-carbonyl chloride in 125 cc. of ether over a period of 1 hour. The mixture was allowed to stir several hours at room temperature. The salt was separated by filtration and the filtrate was washed thoroughly with dilute hydrochloric acid and dilute sodium hydroxide. After drying over anhydrous potassium carbonate, the ether was removed under reduced pressure leaving a light colored oil which crystallized when treated with n-hexane (Skelly–B). The solid was collected by filtration, washed thoroughly with n-hexane (Skelly–B) and dried, yielding 22.4 g. of the mixture of isomers, M.P. 82–90° C.

*Analysis.*—Calcd. for $C_{18}H_{19}NO_3$: N, 4.71. Found: N. 4.64.

Example 3

*N-(1-[3-Indolyl]-2-Butyl)-1,4-Benzodioxane-2-Carboxamide*

A mixture of 9.4 g. (0.05 mole) of alpha-ethyltryptamine, 7.0 g. (0.05 mole) of potassium carbonate, 10 g. (0.05 mole) of 1,4-benzodioxane-2-carbonyl chloride and 250 cc. of anhydrous benzene was refluxed for 3 hours. The inorganic salts were separated by filtration and the filtrate was washed with 100 cc. of 5% hydrochloric acid, 100 cc. of 5% sodium bicarbonate and 100 cc. of water. After drying over anhydrous potassium carbonate, the solvent was removed under reduced pressure. The residue was triturated with n-hexane (Skelly–B) and the solid collected by filtration yielding 8.75 g., M.P. 99–102° C.

*Analysis.*—Calcd. for $C_{21}H_{22}N_2O_3$: N, 7.99. Found: N. 7.83.

A solid, which was probably a single pure isomer, was obtained by solution of the oily reaction residue in boiling ether and concentration and dilution with an equal volume of n-hexane (Skelly–B). The product thus obtained was about one-half the theoretical amount; M.P. 135–138° C.

*Analysis.*—Calcd. for $C_{21}H_{22}N_2O_3$: N, 7.99. Found: N. 7.91.

Various changes and modifications of the invention can be made and, to the extent that such variations incorporate the spirit of this invention, they are intended to be included within the scope of the appended claims.

What is claimed is:
1. N - (2 - Phenylcyclopropyl) - 1,4 - benzodioxane - 2 - carboxamide.
2. N-(2-Phenyl-1-propyl)-1,4-benzodioxane-2-carboxamide.
3. N-(Phenyl-lower alkyl)-1,4-benzodioxane-2-carboxamide.

References Cited in the file of this patent
UNITED STATES PATENTS

| | | |
|---|---|---|
| 2,814,625 | Speeter | Nov. 26, 1957 |
| 2,838,441 | Allen et al. | June 10, 1958 |
| 2,844,510 | Lorenz et al. | July 22, 1958 |
| 2,908,691 | Robinson | Oct. 13, 1959 |

OTHER REFERENCES

Koo et al.: "J. Am. Chemical Society," vol. 77, pages 5373–5375 (1955).

Gaylord: Reduction with Complex Metal Hydrides, pp. 544–545 (1956).

Dunbar et al.: J. Organic Chem., vol. 22, p. 1686–1688 (1957).

UNITED STATES PATENT OFFICE
CERTIFICATE OF CORRECTION

Patent No. 3,117,978                 January 14, 1964

John H. Biel et al.

It is hereby certified that error appears in the above numbered patent requiring correction and that the said Letters Patent should read as corrected below.

Column 1, line 42, for "p-methoxyphenylcyclopropl" read -- p-methoxyphenylcyclopropyl --; lines 48 to 54, for the upper right-hand portion of the formula reading

Signed and sealed this 26th day of May 1964.

(SEAL)
Attest:

ERNEST W. SWIDER                EDWARD J. BRENNER
Attesting Officer                Commissioner of Patents